United States Patent [19]

Makino

[11] 4,383,276
[45] May 10, 1983

[54] VIDEO DISC PLAYER WITH A FREEZE FRAME FEATURE

[75] Inventor: Junzo Makino, Tokyo, Japan

[73] Assignee: RCA Corporation, New York, N.Y.

[21] Appl. No.: 202,666

[22] Filed: Oct. 31, 1980

[51] Int. Cl.³ .............................................. H04N 5/78
[52] U.S. Cl. ..................................... 358/342; 360/10.1
[58] Field of Search .................... 360/10, 10.1; 369/14, 369/15; 358/128.5, 128.6, 312, 342

[56] References Cited

U.S. PATENT DOCUMENTS

| | | | |
|---|---|---|---|
| 3,509,274 | 4/1970 | Kihara | 360/10 |
| 3,524,018 | 7/1970 | Kihara | |
| 3,732,362 | 5/1973 | Kinjo | 360/10 |
| 3,947,870 | 3/1976 | Yumde et al. | 358/4 |
| 3,999,218 | 12/1976 | Iyama et al. | 360/10 |
| 4,058,840 | 11/1977 | Kasprzak | 360/10 |
| 4,133,009 | 1/1979 | Kittler et al. | 360/9 |
| 4,161,753 | 7/1979 | Bailey et al. | 360/9 |
| 4,193,098 | 3/1980 | Bixby et al. | 360/11 |

Primary Examiner—Bernard Konick
Assistant Examiner—Donald McElheny, Jr.
Attorney, Agent, or Firm—E. M. Whitacre; J. S. Tripoli; E. P. Herrmann

[57] ABSTRACT

A "freeze frame" video disc player is described for playback of records having an integral number of TV signal frames per circular information track or per convolution of a spiral information track. The player includes a stripe of magnetic material secured to the periphery of the player turntable and magnetic transducer apparatus for repeated recording and recovery of the frozen frame to and from the magnetic stripe.

14 Claims, 6 Drawing Figures

VIDEO DISC PLAYER WITH A FREEZE FRAME FEATURE

BACKGROUND OF THE INVENTION

This invention relates to video disc players and in particular to apparatus for the repeated replaying of a selected segment of signal recovered from a disc record.

Video disc records typically have information stored thereon in circular tracks or a continuous spiral track. The information is segmented into video fields, two fields when interlaced comprising a frame or one complete television picture. Each circular track or spiral convolution typically contains an integral number of frames, and the frames on adjacent tracks are typically aligned, i.e., the starting location and the terminal location of respective frames on adjacent tracks occur at the same angular coordinate of the disc.

Signal is recovered from the disc by a track following signal pickup transducer which may actually contact the disc as in the capacitive disc systems or may be removed from the disc as in the optical disc systems. In normal operation, playback is effected by rotating the disc to create relative disc-signal pickup transducer motion, the frames of signal information passing the transducer in an ascending succession as the transducer traces the track from convolution to convolution or is regularly displaced from circular track to circular track for each 360 degrees of disc rotation.

A freeze frame mode of operation is easily accomplished if the information tracks contain only one frame of information per track. By failing to advance the pickup transducer at the end of the track (concentric circular tracked disc) or by deflecting the pickup transducer back one track convolution (spiral tracked disc) the same frame is replayed as often as desired and thereby frozen. On the other hand, if each track contains more than one frame of information, replaying any particular track replays each of the frames in the track and unless each of the frames in the particular track is identical, some change or motion will occur in the displayed signal, producing an undesirable result. In order to effect freeze frame from discs having this last mentioned signal format, it becomes necessary to snatch the desired frame and put it in memory from which it can be repeatedly accessed, and replayed. The cost of most memory systems to accomplish such frame snatching is generally prohibitive to their use in consumer video disc players. The present invention, however, provides a low cost memory system for a video disc player to provide frame snatching for freeze frame or other special playback effects.

SUMMARY OF THE INVENTION

According to the present invention, a magnetic stripe, such as a piece of magnetic recording tape, is circumferentially attached to the edge of the player turntable. At least two magnetic recording/replay transducers are arranged adjacent the magnetic stripe for recording and recovering signal thereon. The magnetic transducers are separated an angular distance corresponding to the angle encompassed by one frame on the disc. When a particular frame is to be frozen, one of the magnetic transducers records that frame on a sector of the stripe contemporaneous with its display on a TV receiver. At the completion of the recovery, display and magnetic recording of the particular frame, the recorded portion of the magnetic stripe has advanced to the second magnetic transducer which replays the frame as the turntable continues to rotate. This replayed frame is simultaneously displayed on the receiver and rerecorded onto another sector of the magnetic stripe by the first magnetic transducer. This process is repeated until the entire magnetic stripe has been recorded with the same information frame an integral number of times. The signal frames recorded on the magnetic stripe can be replayed as often as desired to produce a "frozen" display of any duration.

Other embodiments of the invention will appear from a reading of the following detailed description in conjunction with the accompanying drawings.

DETAILED DESCRIPTION OF THE INVENTION

Figure 1:
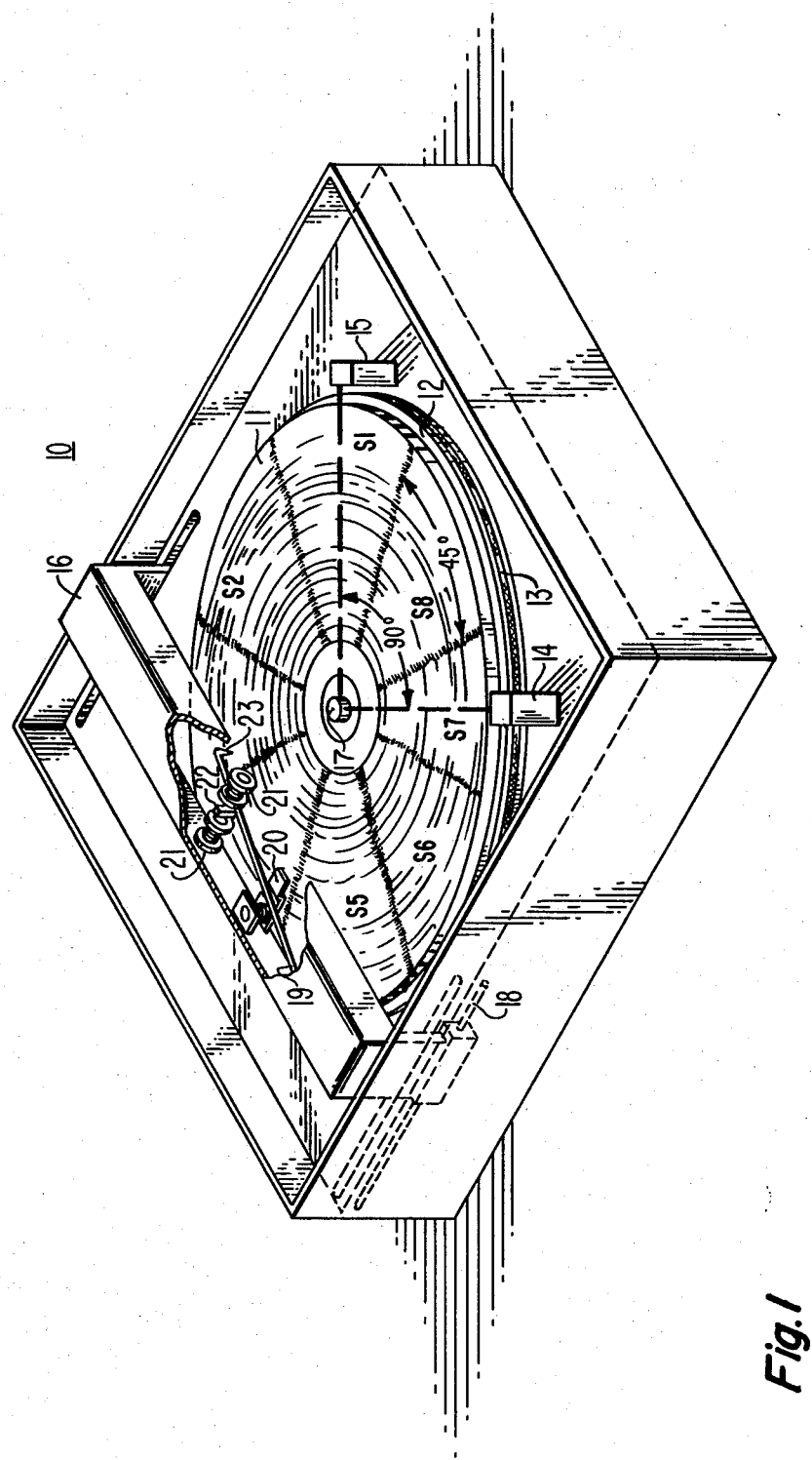
FIG. 1 schematically illustrates in perspective a video disc player incorporating the present invention.

Referring to FIG. 1 a video disc player 10 has a rotatable base 12 or turntable for supporting a disc record 11 at a constant angular velocity. A signal pickup transducer (stylus) 23, supported in the arm carriage 16, engages and tracks the disc record to recover signal therefrom. The arm carriage 16 is supported on rails 18 to constrain movement of the carriage to a particular direction. The carriage is driven by a motor (not shown) to radially translate the stylus in synchronism with the information to be recovered. The arm carriage contains a stylus deflection transducer comprising coils 21 and a permanent magnet 22 fixed to the stylus supporting arm 19. When the coils are energized, a magnetic field is generated therebetween which exerts a force on the permanent magnet 22 to move the stylus arm 19 and thereby the stylus 23 incrementally in a radial direction across the record in accordance with the magnitude and polarity of the field generated. The carraige also supports a stylus lifter transducer 20 which engages and upwardly pivots the stylus arm upon the appropriate command.

A stripe of magnetic material 13, video quality magnetic recording tape for example, is secured to the circumference of the turntable 12. First and second magnetic record/replay transducers 14 and 15 are positioned proximate the turntable and the magnetic stripe for selectively recording signal onto the magnetic stripe and replaying signal from the stripe.

The angular displacement between the magnetic transducers with respect to the turntable axis of rotation 17 is dependent upon the signal recording format of the disc record 11. The transducers are spaced apart by an amount equal to a complete segment of recorded information. Disc record 11 is shown divided into 8 sectors S1–S8. Each sector comprises one complete field of TV signal per track, thus, there are 8 fields or 4 frames of TV signal per 360 degrees of information track. The angular displacement between fields is 360/8=45 degrees and 90 degrees between frames. The system incorporated in FIG. 1 is arranged to replay a full frame of signal when operating in the freeze frame mode. In order that an integral number of frames of video signal from the disc record will be recorded on the magnetic stripe by the magnetic record/replay transducers, and, so that each of the magnetic transducers is accessing a similar signal position in the respective frames currently adjacent thereto, the transducers are angularly displaced by the angle comprising one frame on the disc, i.e., 90 degrees.

In the material that follows, it will be assumed that a disc record having 8 fields (8 sectors) or 4 frames per convolution will be played on the video disc player. However, it should be recognized that the concepts to be explicated are applicable to player systems for discs with other recorded formats. For example, if a particular disc is formatted with 5 frames per track convolution, the magnetic transducers would be angularly displaced by integral multiples of 360/5=72 degrees. In more general terms, any system having signal formatted in N basic segments per convolution or circular track would have magnetic record/replay transducers disposed proximate the magnetic stripe displaced by integral multiples of 360/N degrees.

Figures 2A, 2B:
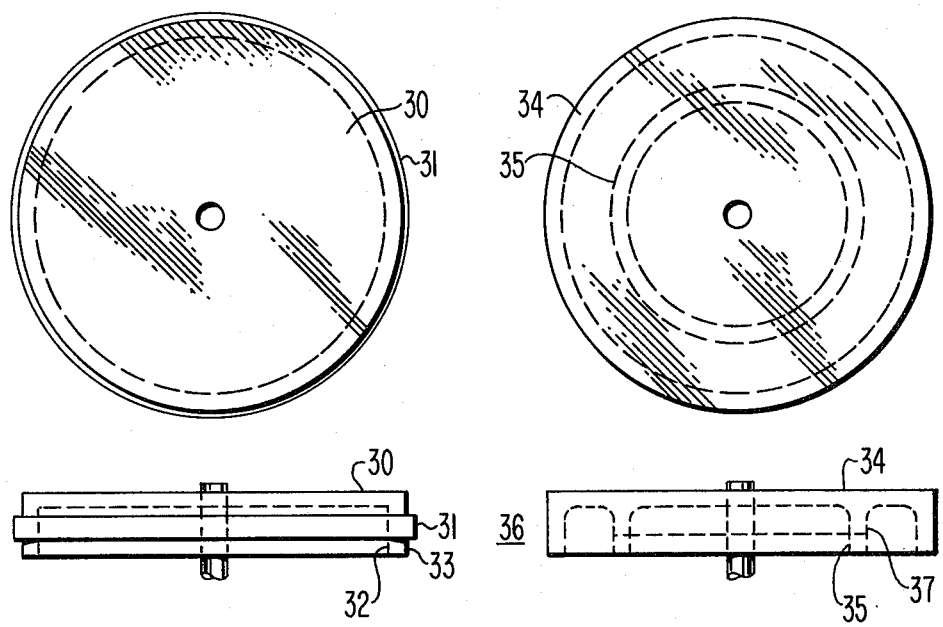
FIGS. 2A and 2B show two arrangements for orienting a magnetic stripe on a player turntable.

Referring now to FIG. 2, two arrangements for positioning the magnetic stripe on a player turntable are shown. In FIG. 2A, a turntable having a disc record supporting face 30 has a magnetic stripe 31 fixed to an outer circumferential face 33. Alternatively, the stripe could be secured to an inner circumferential area 32. FIG. 2B illustrates a turntable 36 having a circular magnetic stripe 35 secured to a structural element 37 opposite the disc record supporting face 34.

Figure 3:
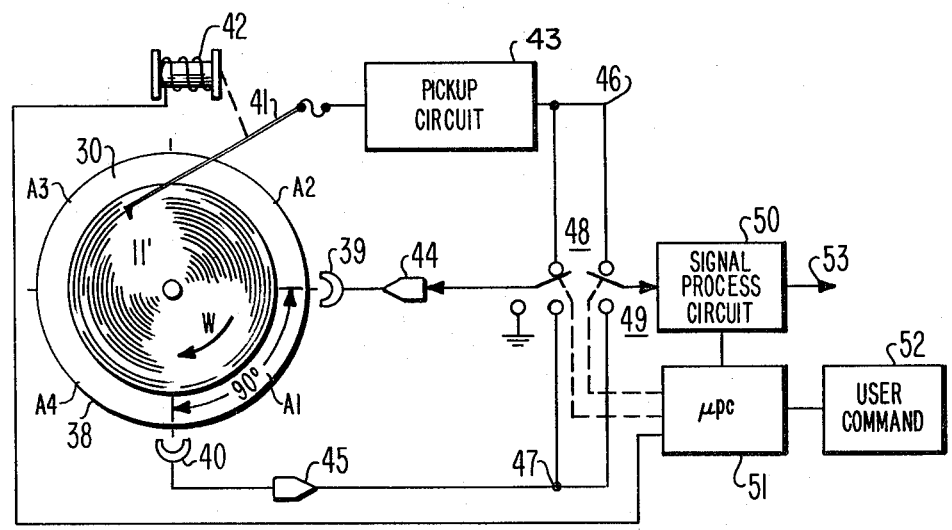
FIGS. 3 and 4 are partial block, partial schematic diagrams of video disc players with a magnetic stripe storage means secured to the player turntable.

FIG. 3 depicts a disc player having a turntable 30 with a magnetic stripe 38 secured to its periphery. Two magnetic record/replay transducers 39 and 40 are located proximate the magnetic stripe and displaced 90 degrees apart. Transducer 39, energized by amplifier 44, which is selectively responsive to signal present at circuit connections 46 and 47, records selected signal segments onto the magnetic stripe 38. Transducer 40, on the other hand, replays signal from the magnetic stripe, the replayed signal being amplified in amplifier circuitry 45.

A signal pickup transducer 41 engages a disc record 11' and cooperating with signal pickup circuitry 43 recovers signal therefrom. During normal playback, the recovered signal from circuitry 43 is applied via switch 49 to the signal processing circuits 50 which conditions the signal for reception by a conventional TV receiver (not shown) connected to output terminal 53.

A deflection transducer 42, capable of incrementally stepping the signal pickup transducer 41 precisely across one or more tracks is incorporated in the player. The transducer 42, responsive to control signals from microprocessor 51, urges the pickup transducer forward or backward across the disc record to correct for anomalous tracking of a grooved record or servo controls the pickup transducer to follow the information tracks in a grooveless record system.

The player operates in freeze frame mode responsive to the user activating that player option via user control circuitry 52 sequencing the microprocessor through the requisite functions, or automatically via the microprocessor responding to commands incorporated in the signal recovered from the disc record. In either event, when the player is alerted to freeze a particular frame of video signal, the microprocessor 51 disconnects the amplifier 44 input connection from the ground terminal of switch 48 and connects it to the output connection 46 of the pickup circuitry. Connection 46 is concurrently connected via switch 49 to the signal processing circuitry 50 and applied to a display device. Thus, as the frame to be frozen is being recovered from the disc, it is being recorded on a first 90 degree sector of the magnetic stripe, A1, for example. Upon completion of recovery and simultaneous recording of the particular frame, the beginning of the recorded frame is in position for replay by magnetic replay transducer 40. At this time, the microprocessor synchronized by the vertical sync pulse component of the recorded signal connects the input terminal of the signal processing circuits 50 and the input connection of amplifier 44 to the output connection 47 of replay amplifier 45. The signal recorded in sector A1 of the magnetic stripe is replayed by magnetic transducer 40 and displayed, and concurrently rerecorded by magnetic transducer 39 onto sector A2 of the magnetic stripe which is subsequently rerecorded in sector A3, etc. When the four sectors A1, A2, A3 and A4 contain the desired signal frame, amplifier 44 is again connected to ground potential and transducer 40 replays the frame until the "freeze" command is removed. The signal pickup transducer is either lifted and disengaged from the disc while in the freeze mode or it may be deflected back one convolution for each revolution of the disc record so that it will be in position to continue signal recovery at the point of frame freeze.

Figure 4:
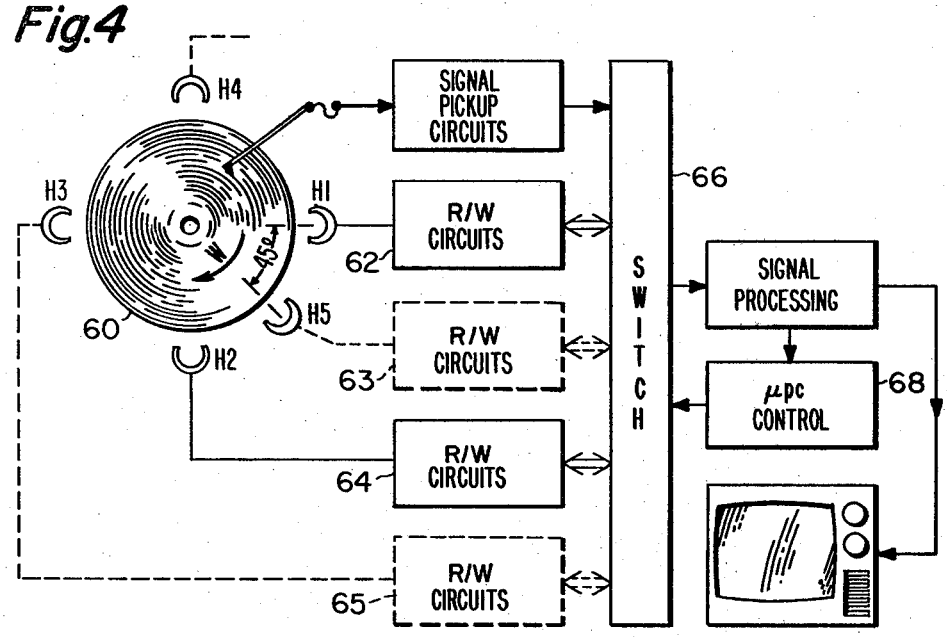

FIG. 4 illustrates a similar player having a plurality of record/replay heads H1 to H5 with respective amplification circuitry 62 to 65 enabling each head or transducer to either record or replay signal to or from magnetic stripe 60. The mode of operation is controlled by microprocessor controller 68 through a switch matrix 66.

First consider the FIG. 4 player to utilize only the heads H1 and H2. The record-replay capability of both magnetic heads produces a system superior in performance to that of FIG. 3, where head 39 is dedicated to recording and head 40 is dedicated to replay. It should be recognized in the FIG. 3 system that each successive frame rerecorded onto a new sector of the magnetic stripe with signal recovered from a previously recorded sector of the stripe is inherently degraded by the addition of electrical noise. However, a system with heads that both record and replay, reduces the percentage of rerecorded frames displayed, thereby enhancing system performance.

Figure 5:
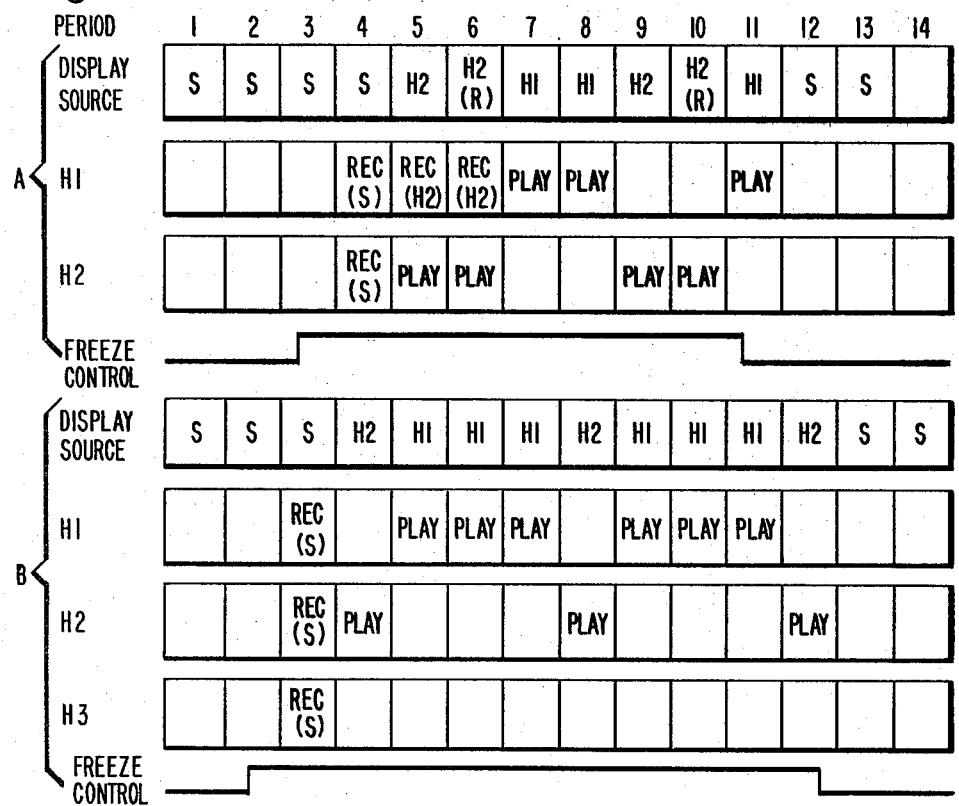
FIG. 5 is a timing illustration of two operational modes of the FIG. 4 video disc player.

The two head operation of the FIG. 4 system will more readily be understood with the aid of the FIG. 5A diagram. In FIG. 5A the numbers in the row designated "period" correspond to signal recovery periods, each period comprising a single frame of information. The symbols in the row designated "Display Source" indicate the source of the signal presently being displayed on the TV receiver, i.e., "S" for signal directly from the disc, "Hi" for signal from the respective magnetic head and H2$_R$ for signal from magnetic head H2 recovering signal from a magnetic stripe sector having been rerecorded with signal from another stripe sector. The rows designated H1 and H2 indicate the mode in which the particular head is operating, i.e., "Rec" is record mode with the subscript indicating its source of signal and "Play" is the replay mode.

At period 1 the player is operating in a normal mode where each occurring signal frame is successively recovered from the disc and displayed in real time. The system is operating in this mode into period 3 when a "freeze" command occurs. The system continues operating in the normal mode until the combination of the freeze command and the next vertical sync pulse activate the freeze sequence to freeze the next successive frame. This frame (period 4) is recovered by the pickup transducer and displayed on the receiver. As it is being displayed, it is simultaneously directed to both heads H1 and H2 for concurrent recording on two 90 degree sectors of the disc. At the completion of recovery of the particular frame, head H2 is conditioned to replay the frame recorded by head H1 while H1 rerecords the frame recovered by H2 onto a third 90 degree sector of the magnetic stripe. Three 90 degree sectors of the stripe have been recorded up to this point, i.e., the end of period 5. The fourth 90 degree sector may be left blank because one of the heads H1 and H2 will always be in position to access and replay one of the already recorded sectors. Note that only one of the sectors was rerecorded with signal from the magnetic stripe as a signal source. By properly sequencing the heads H1 and H2 for replay of the frame for "freeze frame" performance only every fourth frame will have suffered from the effects of rerecording degradation (periods 6 and 10 in the diagram).

The addition of a third head H3 permits concurrent recording of three like frames on three sectors of the magnetic stripe. Subsequently, two of the heads, H1 and H2 for example can be selectively directed to access and replay the three recorded frames from the magnetic stripe. The third head renders rerecording the signal unnecessary and consequently, the replay display suffers no rerecording degradation. See FIG. 5B for one particular record and replay sequence.

At this point, it is apparent that different combinations of magnetic record/replay heads provide certain advantages. For example, the addition of a fourth head permits instant access to any frame recorded on the magnetic stripe enabling the realization of player options other than freeze frame. Note further that including a further head, H5, at a 45 degree displacement from head H1 provides a means to access the recorded signal segments on a field by field basis to implement freeze frame with conventional skip field recording techniques and signal processing apparatus.

What is claimed is:

1. A video disc player of the type for reproducing signal from circular or spiral information tracks disposed on the surface of a capacitive type or optical type disc record, each circular track or spiral convolution having N frames of video signal recorded therein, N being an integer greater than one; said player comprising:

a turntable base having a first surface for rotatably supporting said disc record;

An endless stripe of magnetic material disposed on a second circumferential surface of said turntable and being susceptible of electrically recording information thereon;

at least two magnetic record/replay transducers disposed adjacent said magnetic stripe for recording and reproducing signal thereon, said transducers arranged at multiples of 360/N degrees with respect to each other so that N frames of said video signal may be recorded on said stripe;

signal pickup means cooperating with said disc record for the sole purpose of recovering signal therefrom;

means coupled with said signal pickup means and said transducers for applying selective frames of signal recovered by selective ones of said transducers or said pickup means to others of said transducers for recording or rerecording said selected frames on the magnetic stripe; and means for selectively applying signal frames recovered from one of said transducers and said signal pickup means to a player output terminal in a sequence different from real time signal recovery from the disc record.

2. The video disc player set forth in claim 1 including a further magnetic record/replay transducer proximate the magnetic stripe and displaced from at least one of the other of said magnetic record/replay transducers by 180/N degrees.

3. The video disc player set forth in claim 1 wherein the magnetic transducers are displaced 90 degrees relative to one another.

4. The video disc player set forth in claim 1 wherein the magnetic transducers are displaced 45 degrees relative to one another.

5. The video disc player set forth in claim 1 including further means for altering the normal progression of the signal pickup means radially across the disc.

6. The video disc player set forth in claim 5 wherein the further means comprises a signal pickup deflection means for selectively displacing the signal pickup means a prescribed number of tracks on the disc record.

7. The video disc player set forth in claim 5 wherein the further means comprises means to disengage the signal pickup means from the disc record when signal is being repeated, reproduced and displayed from the magnetic transducers.

8. The video disc player set forth in claim 1 wherein the video disc player includes:

N−1 magnetic record/replay transducers disposed adjacent said magnetic stripe in 360/N degree relationship; and means coupled with said signal pickup means for simultaneously applying selective frames of video signal recovered by said signal pickup means to said N−1 magnetic record/replay transducer for simultaneously recording said selected frames at N−1 locations on the magnetic stripe.

9. The video disc player set forth in claim 1 including N magnetic record/replay transducers disposed adjacent said stripe in 360/N degree relationship; and means coupled with said signal pickup means for simultaneously applying selective frames of video signal recovered by said signal pickup means to said N magnetic record/replay transducers for simultaneously recording the same frames at N locations on the magnetic stripe.

10. The video disc player set forth in claim 1 wherein the means for selectively applying signal frames recovered from one of said transducers and said pickup means to a player output terminal, includes means for selecting the one of the transducers, currently accessing like frames, which is recovering the frame subject to the least number of rerecordings.

11. The video disc player set forth in claim 1 including 1+N/2 magnetic record/replay transducers with N/2 of said transducers at 2(360)/N degree angular increments and the remaining one of said transducers angularly related to two of the N/2 transducers by 360/N degrees.

12. A video disc player for recovering signal from capacitive type disc records having signal recorded in information tracks thereon, each track having N complete segments of information per track, N being an integer greater than one, with segments being radially aligned from track to track, said player comprising:

a turntable for rotatably supporting said disc record;

a signal pickup transducer solely for recovering signal from the disc record;

a stripe of magnetic recording material secured on a circumferential surface of the turntable perpendicular to the disc supporting surface of said turntable;

a magnetic recording transducer positioned proximate the magnetic stripe for recording signal thereon when relative velocity is created therebetween;

a magnetic replay transducer positioned proximate said magnetic stripe displaced from said magnetic recording transducer by 360/N degrees in the direction of turntable rotation;

first means for altering the normal progression of the signal pickup transducer radially across the disc;

second means for selectively applying signal segments from one of said signal pickup transducer and said magnetic replay transducer to a player output terminal to produce a signal sequence different from a normal sequence of recovered signals;

further means for selectively applying selected signal segments from one of said signal pickup transducer and said magnetic replay transducer to said magnetic recording transducer for recording said selected segments on the magnetic stripe.

13. The video disc player set forth in claim 12 wherein said first means includes means for deflecting the signal pickup transducer radially across a selected number of information tracks.

14. The video disc player set forth in claim 12 including control means synchronized with components of the recorded signal segments for activating said first, second and said further means in a desired sequence.

* * * * *